(12) United States Patent
Budaya et al.

(10) Patent No.: US 7,287,139 B2
(45) Date of Patent: Oct. 23, 2007

(54) MAINTENANCE OF PERSISTENT DATA USING BITMAPS

(75) Inventors: Angelique R. Budaya, Tucson, AZ (US); Aaron S. Mahar, Tucson, AZ (US); James A. Springer, Sr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/898,603

(22) Filed: Jul. 23, 2004

(65) Prior Publication Data

US 2006/0020618 A1 Jan. 26, 2006

(51) Int. Cl.
*G06F 12/00* (2006.01)

(52) U.S. Cl. ...................... 711/162; 711/170

(58) Field of Classification Search .......... 711/162, 711/170
See application file for complete search history.

(56) References Cited

U.S. PATENT DOCUMENTS

| | | | |
|---|---|---|---|
| 5,592,675 A | 1/1997 | Itoh et al. | |
| 5,754,853 A | 5/1998 | Pearce | |
| 5,799,324 A | 8/1998 | McNutt et al. | |
| 5,896,536 A | 4/1999 | Lindsey | |
| 6,351,751 B1 | 2/2002 | Traversat | |
| 6,434,641 B1 | 8/2002 | Haupt | |
| 6,681,283 B1 | 1/2004 | Thekkath et al. | |
| 6,823,349 B1* | 11/2004 | Taylor et al. | 707/204 |
| 7,096,331 B1* | 8/2006 | Haase et al. | 711/162 |
| 2002/0019923 A1* | 2/2002 | Reuter et al. | 711/206 |
| 2002/0035596 A1* | 3/2002 | Yang et al. | 709/203 |
| 2002/0103948 A1 | 8/2002 | Owen et al. | |
| 2002/0152423 A1 | 10/2002 | McCabe | |
| 2002/0174297 A1 | 11/2002 | McDonald et al. | |
| 2003/0163777 A1 | 8/2003 | Holt | |

* cited by examiner

*Primary Examiner*—Reba I. Elmore
(74) *Attorney, Agent, or Firm*—Quarles & Brady LLP

(57) ABSTRACT

A system is employed to maintain persistent operation information for implementation on persistent data. Bitmaps are created to track outstanding persistent operations. Should a volume of information became inaccessible, the bitmaps are evaluated to determine if outstanding persistent operations exist and, if so, these outstanding operations are performed before the volume is integrated into the logical memory space. Additionally, operation-in-progress bitmaps are utilized to indicate that persistent data within a volume is being modified.

15 Claims, 8 Drawing Sheets

MAINTENANCE OF PERSISTENT DATA USING BITMAPS

BACKGROUND OF THE INVENTION

1. Field of the Invention

This invention is related in general to the field of information handling systems. In particular, the invention consists of a method of preserving operations on persistent data during power interruptions.

2. Description of the Prior Art

In a computing system, digital information is often stored within storage server systems that include hard disk drives, magnetic tapes, optical disks, or other memory storage device. These memory storage devices are usually segregated into ranks or redundant arrays of independent disks ("RAIDS"). This allows for striping information over numerous memory storage devices to provide redundancy in case of a device failure. Each memory storage device may be divided into a plurality of segments. Additionally, each memory storage device may include a reserved area separate from the segments. Both the reserved area and the segments include continuous areas for writing information to and reading information from referred to as tracks.

A memory storage device may include several types of tracks, with each type of track being used for a specific purpose. In a complex storage server system, these types of tracks may include status information tracks such as global Copy Services Meta Data ("CSMD") tracks residing within the reserved areas and volume-level Meta Data ("VLMD") tracks residing within the segments.

A storage server system can be logically ordered so that the memory storage devices are used to form a logically continuous memory space. For example, one or more segments may be used to create a volume, e.g., a logical memory space. Volumes are ordered into one or more logical subsystems ("LSS") and one or more logical subsystems form the logical memory space of the storage server system. This logical memory space is used to hold customer or client information.

Operations on reserved area tracks and segment tracks may take many forms, including writing information to them, reading information from them, and clearing them. In a clearing process, information residing on a track is destroyed or erased. An example of an instruction to erase a track is a Clear Status Tracks ("CST") command. When executed, a CST command erases information on the CSMD and VLMD tracks. However, a problem occurs is a memory storage device is inaccessible at the time the CST command is issued.

One method of ensuring that a CST command has been performed on CSMD is to utilize redundant copies of CSMD within the storage server system. If a memory storage device holding CSMD is offline, it may simply be updated from other copies of the CSMD. However, the vast majority of information residing within the storage server system is client or customer information. Because it would not be efficient to store multiple copies of this information over numerous memory storage devices, if a memory storage device is offline when a CST command is issued, there may be no mechanism for ensuring that VLMD is cleared when the device becomes accessible again. If the CST is not performed on these VLMD tracks, stale and potentially damaged data would remain on the tracks.

To solve this problem, information pertaining to whether CST must be performed on VLMD tracks must be logged and maintained in a persistent manner. In a storage server system including logical subsystems, this data must track each volume for each LSS.

In U.S. Pat. No. 5,592,675, Hiromichi Itho et al. disclose saving work states for multiple users on a shared system. A work state is saved as persistent data at power off and restored at power on. However, there is no discussion of how to handle operations, such as a deletion, that could be performed on persistent work states. It would be advantageous to have a system to maintain persistence of operations which are performed on persistent data.

In U.S. Pat. No. 6,351,751, Bernard Traversat et al. describe a persistent data manager client/server interface but does not teach how persistence of operations performed on non-volatile data is performed. Rather, the invention teaches who handles the operations to be done on persistent data. A client sends a request to read, modify, or delete non-volatile data and the server performs the action. There is no mention of whether or not the request to modify or delete the non-volatile data is kept persistent in any way. It would be advantageous to have a system that maintains persistent operations to be performed on non-volatile memory.

In U.S. Pat. No. 6,434,641, Michael Haupt et al. teach how to defer read and write accesses for addresses in memory until a time when such data is allowed access. Deferment is implemented by creating a linked list of access requests in a temporary storage structure. Because the nature of this storage structure is temporary, there is no way of remembering these deferred requests across power cycles. It would be advantageous to maintain a deferred operation on inaccessible persistent data even in the event of a power loss.

While some of the above patents and publications may provide a method of managing persistent data, none address the problem of maintaining persistence of operations that must be performed on persistent data. None of these documents indicate how to handle persistent data when the data is inaccessible. Furthermore, these inventions do not offer a method for maintaining operations on persistent data across power cycles. Accordingly, it is desirable to have a method for managing operations on persistent data, even over power cycles and during periods when the persistent data is unavailable.

SUMMARY OF THE INVENTION

The invention disclosed herein is a method of maintaining operations on persistent data when volumes of information become unavailable. This persistent information may include volume-level Meta Data residing on tracks within data segments that form the volumes. A command to Clear Status Tracks is executed, even if the memory storage device containing the VLMD is inaccessible, when a memory storage device containing one or more volumes comes back on line.

One aspect of this invention is a bitmap is created for each logical subsystem in the storage server system. Each bit in the bitmap represents a volume that is subject to a persistent operation, such as a CST. These bitmaps are made persistent by storing them on Meta Data tracks that will be read during volume-online notification.

Each LSS has its own corresponding persistent operation bitmap. These persistent operation bitmaps are anchored in a global control structure. When a system-wide command is issued, all bits of a persistent operation bitmap corresponding to an LSS are set.

Each persistent operation bitmap has a corresponding operation-in-progress bitmap to track volumes that are in the process of having their VLMD cleared. Initially, all the bits of the operation-in-progress bitmap are not set. When a persistent operation is dispatched to a volume, the corresponding bit for that volume within the operation-in-progress bitmap is set. When the persistent operation is completed on the volume, the corresponding bits in the operation bitmap and the operation-in-progress bitmap are cleared. However, if the persistent operation failed on the volume (due to communication or power failure), only the corresponding bit in the operation-in-progress bitmap is cleared.

When a system-wide persistent operation has been executed on the storage server system, the operation bitmaps are copied from the global control structure onto one or more global Meta Data ("GMD") tracks. The GMD resides within the reserved areas of the memory storage devices.

Every time a volume that was inaccessible during a persistent operation becomes available, a volume-online preparation procedure will first check to see if a persistent operation is still pending for that volume. If so, the persistent operation is performed before the volume goes online.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

This invention is based on the idea of using a plurality of bitmaps to track the implementation of a system-wide operation on persistent data within a storage server system. The invention disclosed herein may be implemented as a method, apparatus or article of manufacture using standard programming or engineering techniques to produce software, firmware, hardware, or any combination thereof. The term "article of manufacture" as used herein refers to code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Figure 1:
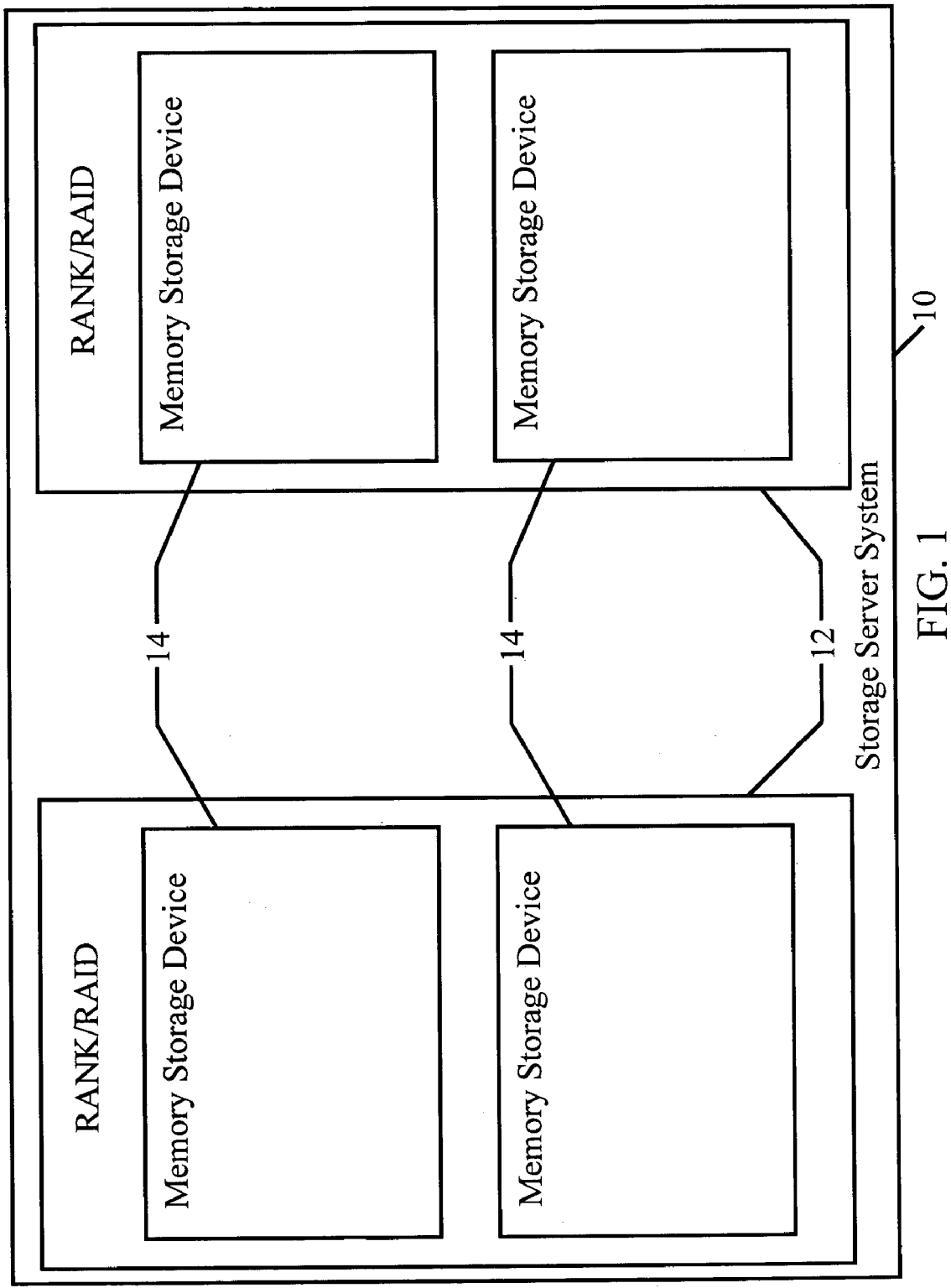
FIG. 1 is a block diagram of the physical components of a server storage system, including one or more ranks of redundant arrays of independent disks ("RAIDS") comprised of a plurality of memory storage devices.
Figure 2:
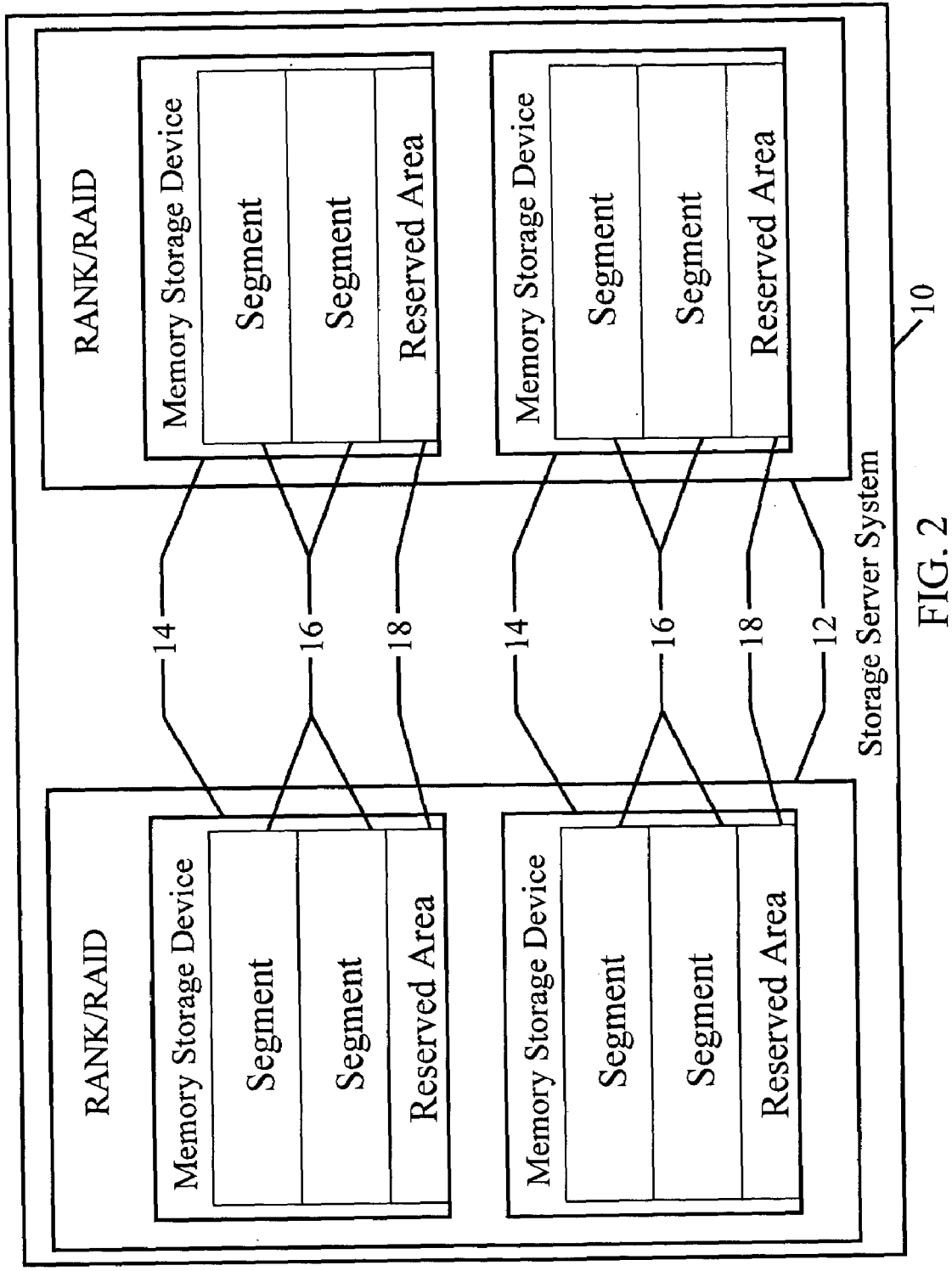
FIG. 2 is a block diagram illustrating the memory storage devices of FIG. 1 divided into segments and a reserved area.
Figure 3:
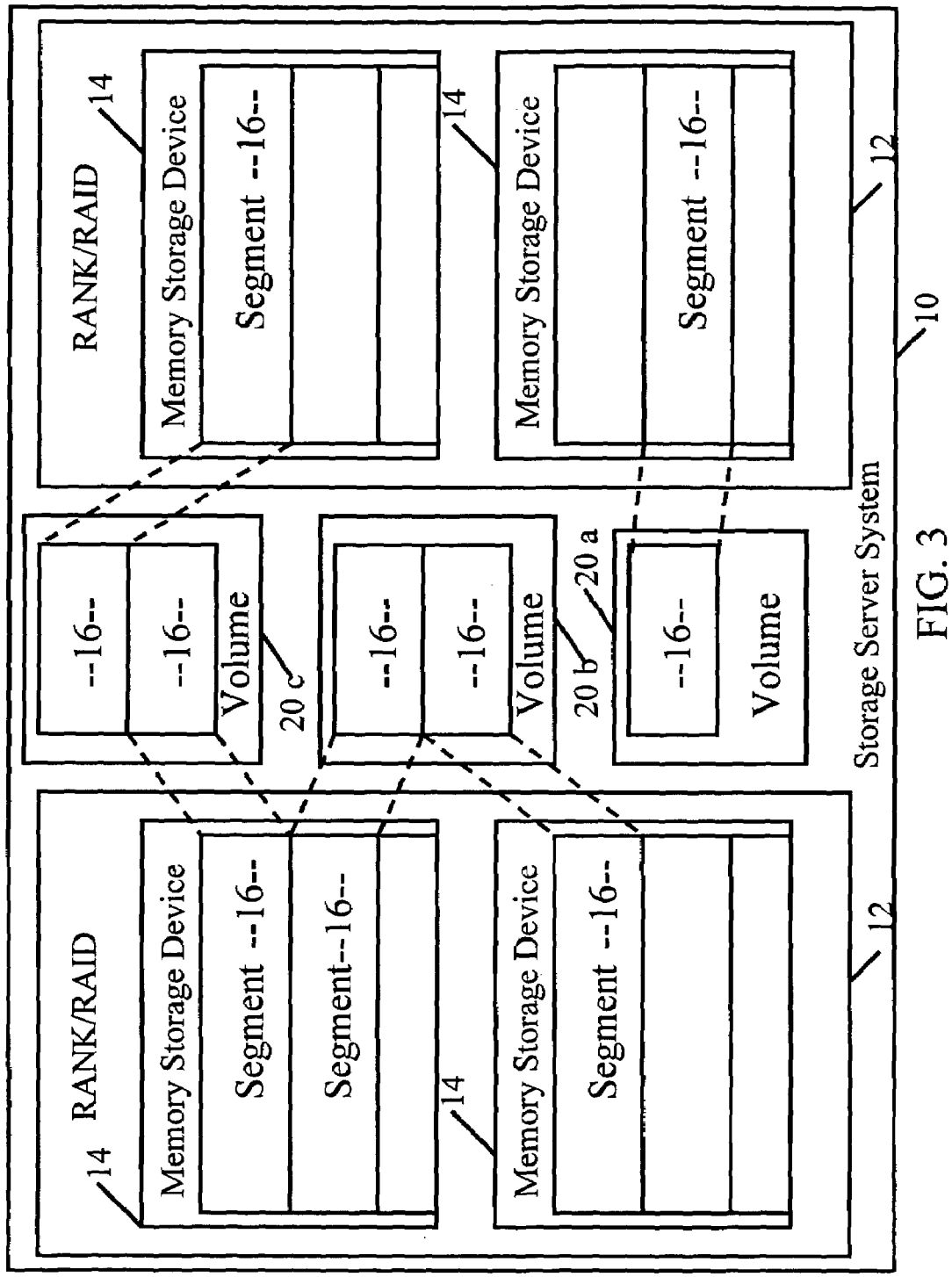
FIG. 3 is a block diagram illustrating the segments of FIG. 2 used to create logical volumes.

Referring to the figures, wherein like parts are designated with the same reference numerals and symbols, FIG. 1 is a block diagram of the physical components of a server storage system 10, including one or more ranks 12 of redundant arrays of independent disks ("RAIDS") comprised of a plurality of memory storage devices 14. These devices 14 may be hard-drives drives, floppy disk-drives, tape cartridges, optical disks, or other type of memory storage device. In FIG. 2, the memory storage devices 14 have been divided into memory spaces including segments 16 and reserved areas 18. In this embodiment of the invention, the segments are one gigabyte ("GB") in size. The segments 16 are combined to form logical memory spaces referred to as volumes 20 as illustrated in FIG. 3. These volumes 20 may be created from one or more segments 16 and may be formed within a single memory storage device (20a), within a rank (20b), or across multiple ranks (20c). Each volume 20 includes a volume-level track 22 for storing volume-level Meta Data ("VLMD") 23 that includes information regarding the status of the corresponding volume 20.

Figure 4:
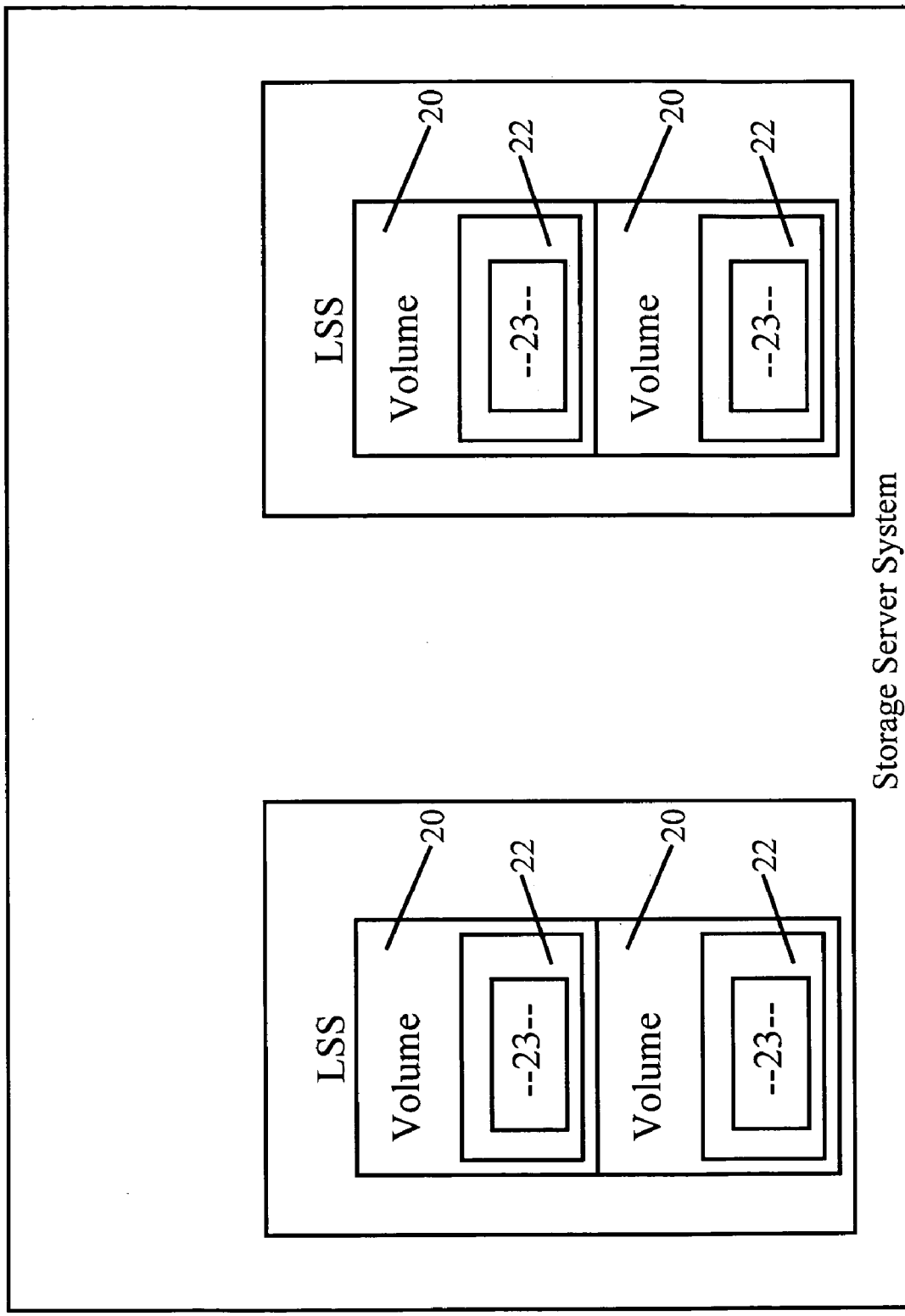
FIG. 4 is a block diagram illustrating the logical structure of the storage server system of FIG. 1 including one or more logical subsystem (LSS), each logical subsystem including one or more volumes.

FIG. 4 illustrates the logical structure of the storage server system 10 (FIG. 1) including one or more logical subsystem ("LSS") 24. In the preferred embodiment of the invention, each storage server system can have as many as 256 logical subsystems. However, the number of logical subsystems is limited only by the number of bits dedicated to addressing each LSS.

Each LSS 24 includes one or more volumes 20 (FIG. 3). In this embodiment of the invention, as many as 256 volumes 20 may be included in each LSS 24. As with the LSS 24, the number of volumes 20 in each LSS 24 is dictated by the number of bits dedicating to addressing the volumes 20. The logical structure made up of the multiple logical subsystems 24 and the volumes 20 within the logical subsystems is a contiguously addressed logical memory space. This contiguously addressed logical memory is used to hold client/customer information as well as the VLMD 23.

Figure 5:
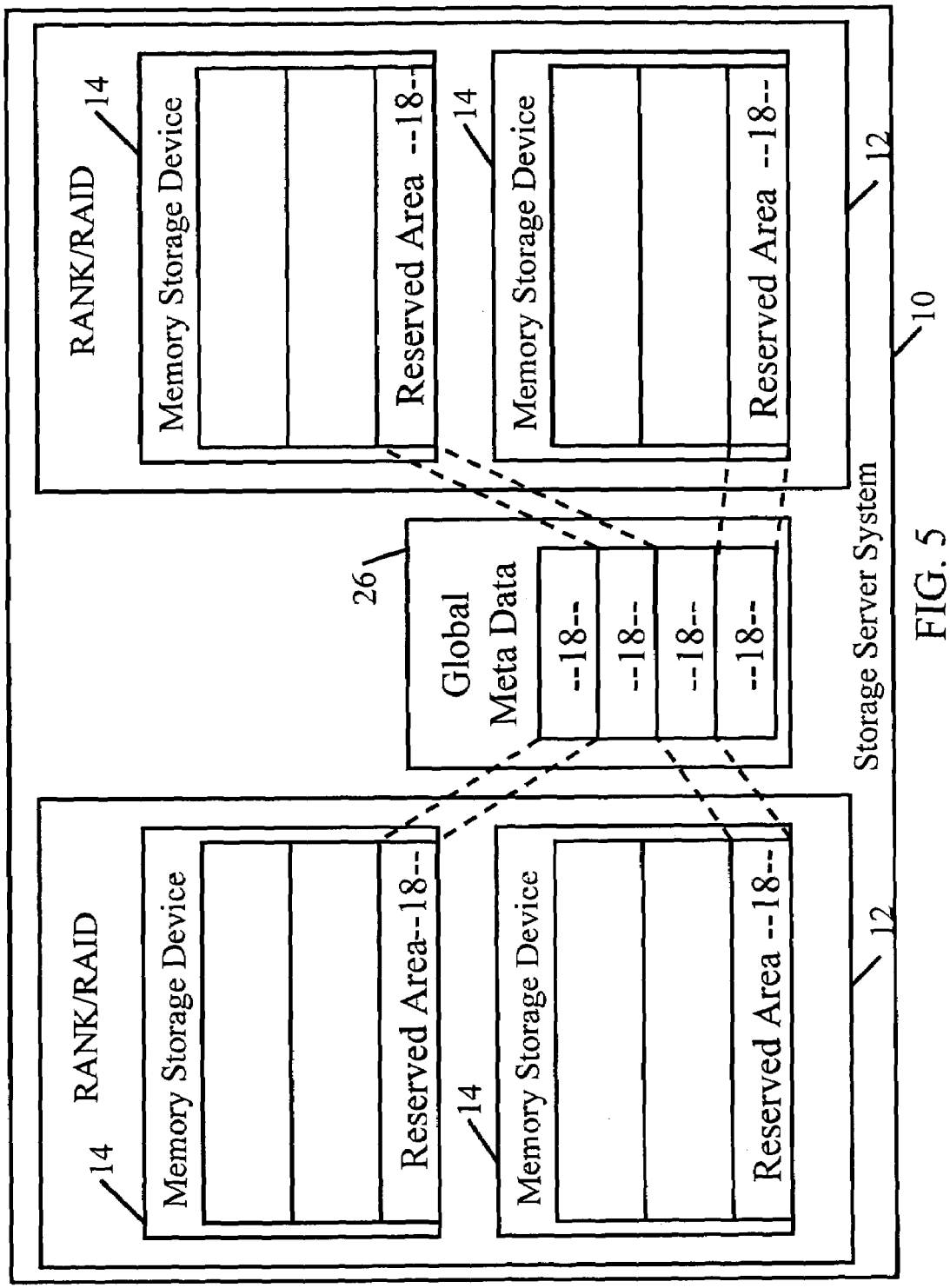
FIG. 5 is a block diagram illustrating the storage server system of FIG. 2, wherein the reserved areas of the memory storage devices has been logically combined to form a global Meta Data ("GMD") space.
Figure 6:
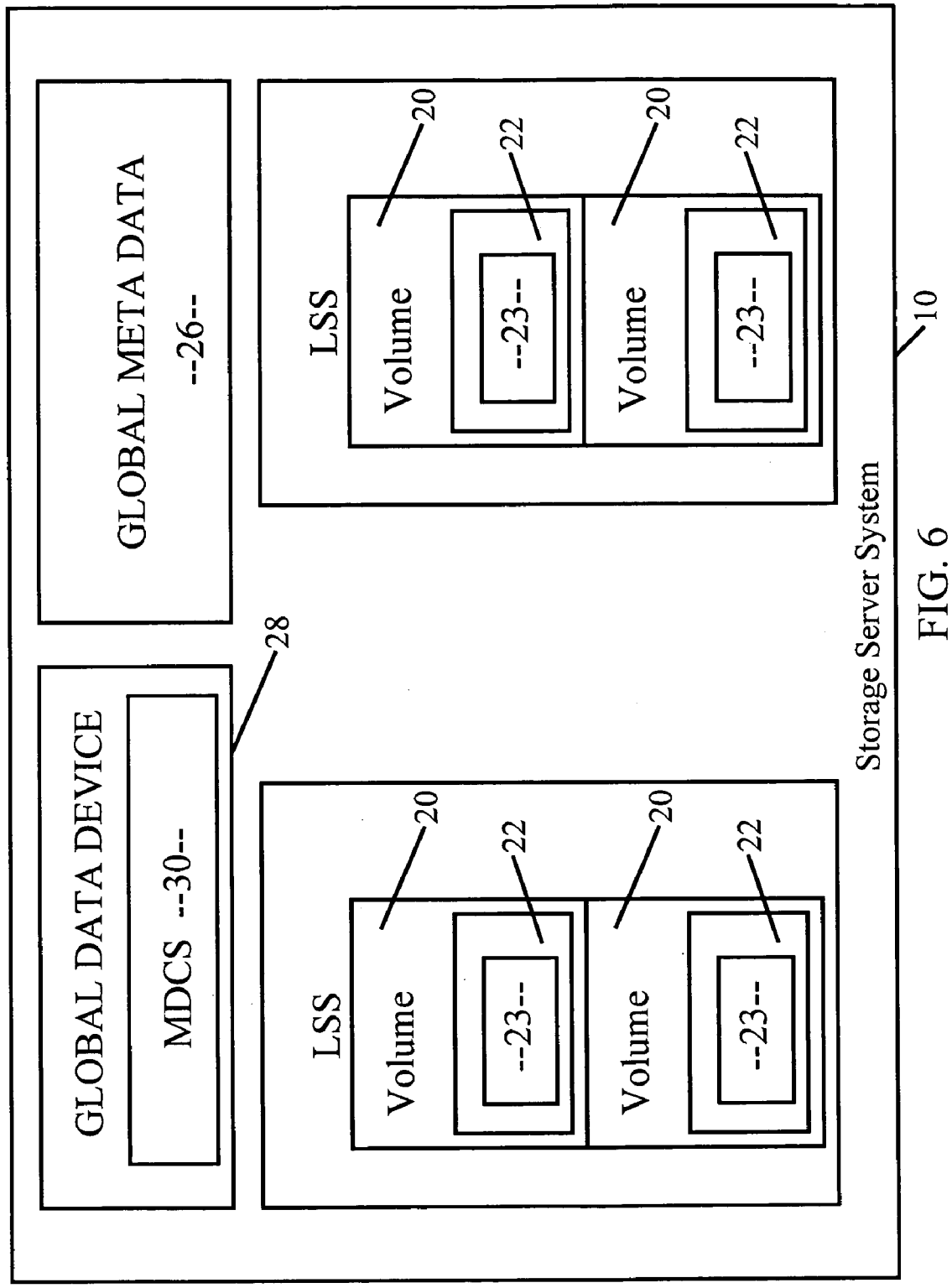
FIG. 6 is a block diagram of the storage server system of FIG. 4 expanded to include the global Meta Data space of FIG. 5 and a device for holding the global Meta Data Control Structure ("MDCS").

FIG. 5 is a block diagram illustrating the storage server system of FIG. 2, wherein the reserved areas 18 of the memory storage devices 14 has been logically combined to form a global Meta Data ("GMD") space 26. The GMD is different from the VLMD 23 as it contains status information pertaining to the entire logical memory space of the storage server system 10. As illustrated in the block diagram of FIG. 6, this embodiment of the storage server system 10 includes the GMD 26 (FIG. 5) and an global data device 28 for holding a global Meta Data Control Structure ("MDCS") 30. The global data device 28 may be random access memory device ("RAM"), a flash memory device, a microprocessor, or other programmable device capable of holding data structures.

Figure 7:
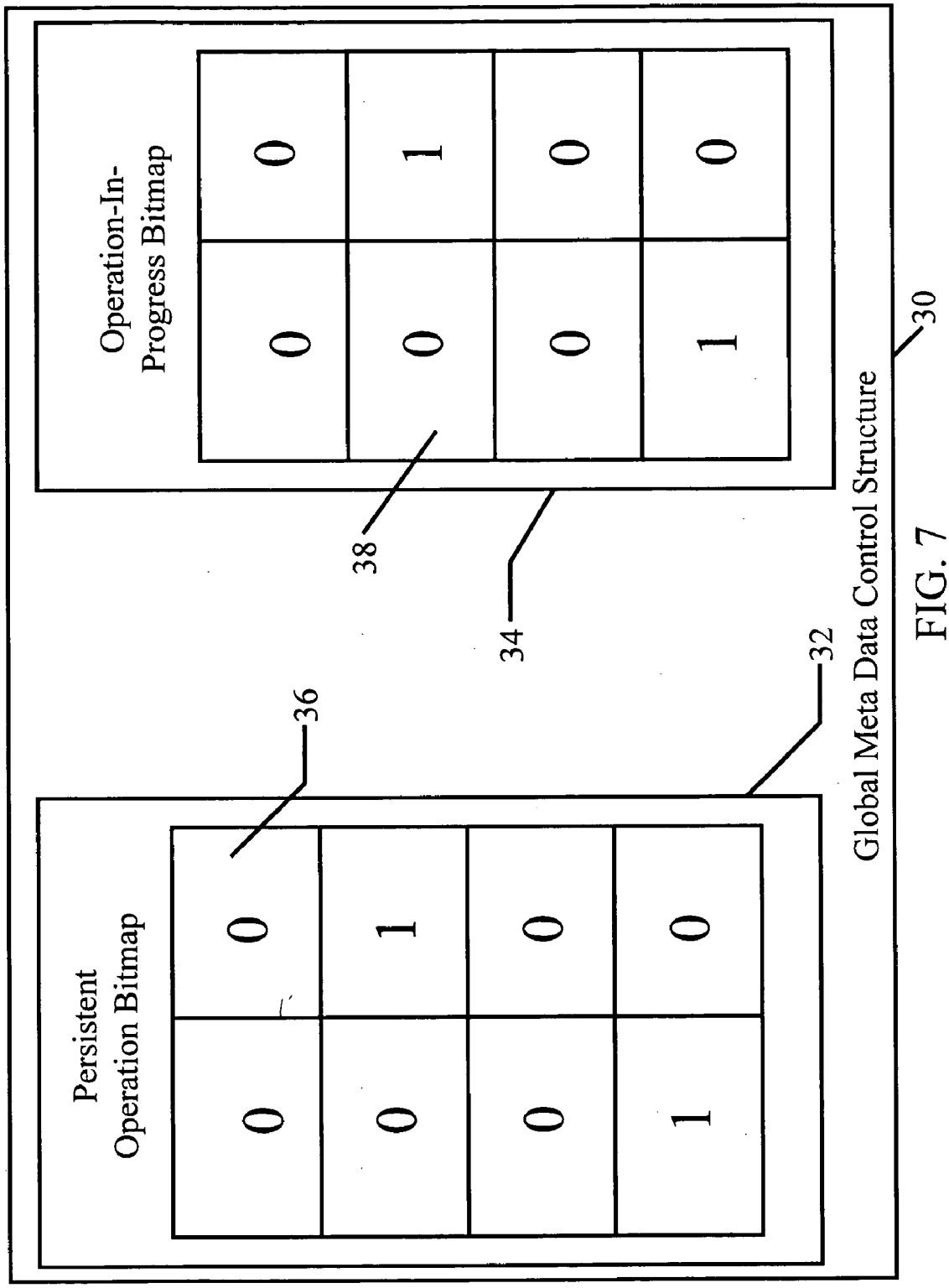
FIG. 7 is a block diagram illustrating the global Meta Data Control Structure of FIG. 6 including a persistent operation bitmap and an operation-in-progress bitmap.

The global MDCS 30 is illustrated in the block diagram of FIG. 7 and includes a persistent operation bitmap 32 and an operation-in-progress bitmap 34 For each LSS 24. Each bit 36 in the bitmap represents a volume that is subject to a persistent operation, such as a CST. These persistent operation bitmaps 32 are made persistent by storing them within the GMD 26. When a memory storage device 14 comes online, a volume-online notification is generated for each associated volume 20 and the MDCS 30 is searched for a corresponding persistent operation bitmap 32. When a persistent system-wide command (such as CST) is issued, all bits of a persistent operation bitmap 32 corresponding to an LSS 24 are set.

Each persistent operation bitmap 32 has a corresponding operation-in-progress bitmap 34 to track volumes 20 that are in the process of having their VLMD 23 modified. Initially, all the bits of the operation-in-progress bitmap 32 are not set. When a persistent operation is dispatched to a volume 20, the corresponding bit 36 within the operation-in-progress bitmap 32 is set. When the persistent operation is completed on the volume, the corresponding bits 36,38 in the persistent operation bitmap 32 and the operation-in-progress bitmap 34 are cleared. However, if the persistent operation failed on the volume 20 (due to communication or power failure), only the corresponding bit 38 in the operation-in-progress bitmap is cleared.

When a system-wide persistent operation has been executed on the storage server system 10, the persistent operation bitmaps 32 are copied from the MDCS 30 onto one or GMD 26 tracks. The GMD 26 resides within the reserved areas 18 of the memory storage devices 14.

Every time a volume 20 that was inaccessible during a persistent operation becomes available, a volume-online preparation procedure will first check to see if a persistent operation is still pending for that volume. If so, the persistent operation is performed before the volume goes online.

Figure 8:
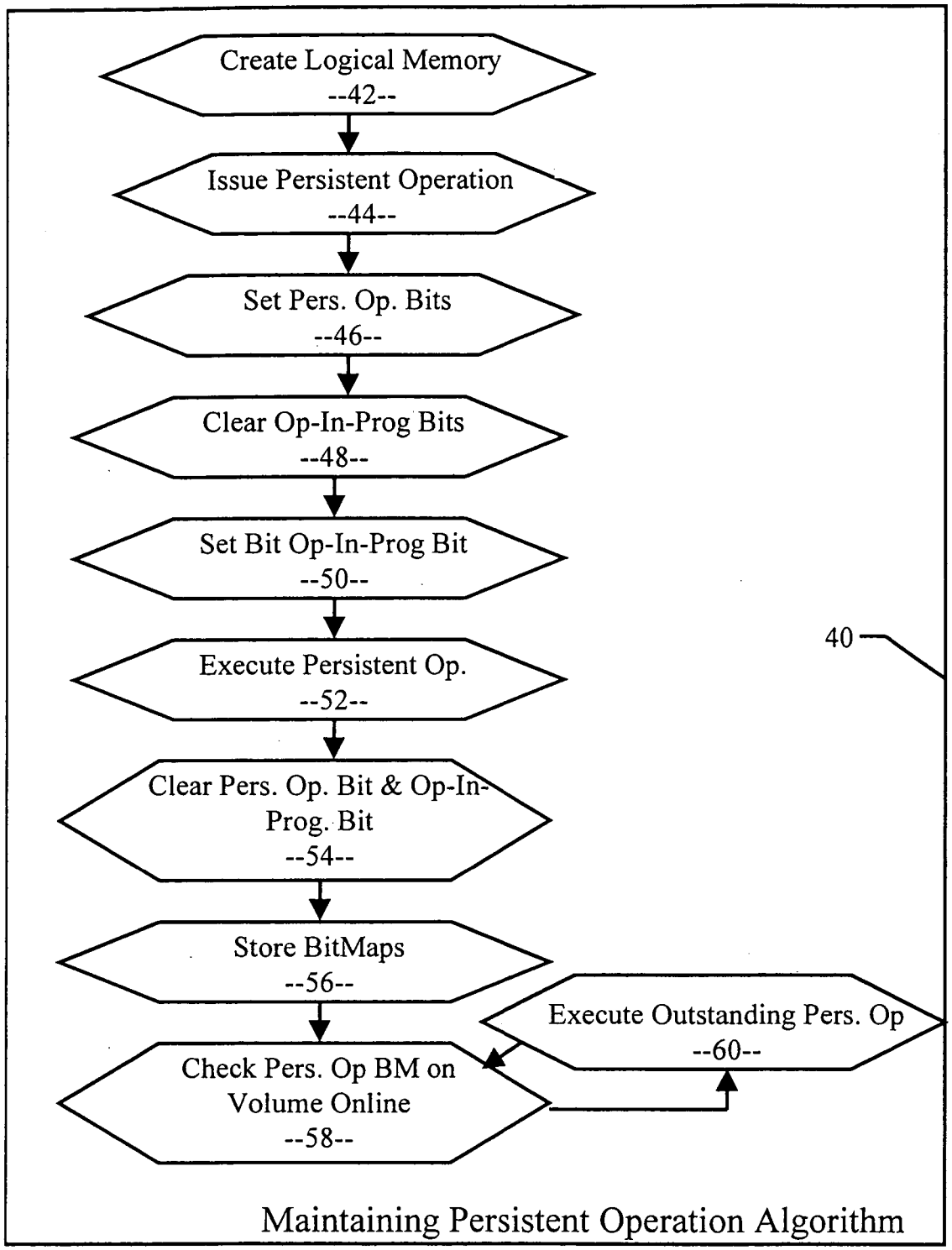
FIG. 8 is a flow-chart illustrating the process of creating a logical memory space.

FIG. 8 is a flow-chart illustrating the algorithm 40 of maintaining persistent operations. In step 42, a logical memory space including one or more logical subsystems 24 is created from one or more volumes 20 created from one or more segments 16 residing on one or more memory storage devices 14. In step 44, a MDCS 30 is created within a global data device 28 including a persistent operation bit map 32 and an operation-in-progress bitmap 34.

A system-wide persistent operation command, such as clear status tracks, is issued in step 44 resulting in the setting all the bits 36 in the persistent operation bit map 32 corresponding to all the volumes 20 (step 46) and clearing all the bits 38 in the operation-in-progress bitmap 34 (step 48).

Instruction are then dispatched to implement the persistent operation command on a volume in step 50 and setting the corresponding bit 38 in the operation-in-progress bitmap 34 in step 52. If the persistent operation command successfully executes (step 52), the corresponding bit 36 in the persistent operation bit map 32 and the corresponding bit 38 in the operation-in-progress bitmap 34 are cleared (step 54). Once the system-wide persistent operation command has been applied to all volumes 20, the persistent operation bitmaps 32 and the operation-in-progress bitmaps 34 are stored (step 56) in the GMD 26. When a volume becomes accessible, the stored persistent operation bitmaps 32 are checked to see if the volume has outstanding persistent operation in step 58 and outstanding persistent operations are implemented in step 60.

Those skilled in the art of maintaining persistent operations on persistent data may develop other embodiments of the present invention. For example, a single bitmap may be implemented for tracking both outstanding persistent operations and operations in progress. Additionally, a bitmap may be created for the entire logical memory space, rather than for each logical subsystem. The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

We claim:

1. A persistent operation implementation system, comprising:
    a storage system including a plurality of logical memory spaces comprising a plurality of volumes, each volume comprising at least one segment, each of said at least one segment residing on one of at least one memory storage device; and
    a global meta data control structure including a first bitmap containing a first plurality of binary digits and a second bitmap containing a second plurality of binary digits, said first and second bitmaps organized for each of the plurality of logical memory spaces in the storage system, each bit in said first and second bitmaps representing each of said plurality of volumes subject to a persistent operation wherein:
    each of said plurality of volumes is associated with a first corresponding binary digit included in said first plurality of binary digits that indicates whether said persistent operation is outstanding and each of said plurality of volumes is also associated with a second corresponding binary digit included in said second plurality of binary digits that indicates whether said persistent operation is in progress,
    upon a system-wide persistent operation which has been executed on said storage system, said first and second bitmaps are copied from a local meta data control structure onto said global meta data control structure, and
    each time an inaccessible volume of the plurality of volumes becomes available, a volume-online preparation procedure queries to determine if a persistent operation is pending for said inaccessible volume, wherein if the query returns in the affirmative, said persistent operation is performed before said inaccessible volume becomes available.

2. The persistent operation implementation system of claim 1, wherein at least one memory storage device includes a magnetic storage device.

3. The persistent operation implementation system of claim 2, wherein the magnetic storage device is a hard disk drive.

4. The persistent operation implementation system of claim 1, wherein the persistent operation is an instruction to clear status track information.

5. The persistent operation implementation system of claim 1, wherein the memory device is a random access memory device.

6. A method of maintaining a persistent operation on persistent data, comprising the steps of:
    creating a storage system including a plurality of logical storage subsystems comprising a plurality of storage volumes;
    creating a global meta data control structure including a first bitmap containing a first plurality of binary digits and a second bitmap containing a second plurality of binary digits, said first and second bitmaps organized according to each of the plurality of logical storage subsystems in the storage system, each bit in said first and second bitmaps representing each of said plurality of storage volumes subject to a persistent operation, wherein:

each of said plurality of volumes is associated with a first corresponding binary digit included in said first plurality of binary digits that indicates whether said persistent operation is outstanding and each of said plurality of volumes is also associated with a second corresponding binary digit included in said second plurality of binary digits that indicates whether said persistent operation is in progress, upon a system-wide persistent operation which has been executed on said storage system, said first and second bitmaps are copied from a local meta data control structure onto said global meta data control structure, and each time an inaccessible volume of the plurality of volumes becomes available, a volume-online preparation procedure queries to determine if a persistent operation is pending for said inaccessible volume, wherein if the query returns in the affirmative, said persistent operation is performed before said inaccessible volume becomes available.

7. The method of claim 6, wherein the storage volume includes a magnetic storage device.

8. The method of claim 7, wherein the magnetic storage device is a hard disk drive.

9. The method of claim 6, wherein the persistent operation is an instruction to clear status track information.

10. The method of claim 6, wherein the storage volume is a random access memory device.

11. An article of manufacture including a data storage medium, said data storage medium including a set of machine-readable instructions that are executable by a processing device to implement an algorithm, said algorithm comprising the steps of:

creating a storage system including a plurality of logical storage subsystems comprising a plurality of storage volumes;

creating a global meta data control structure including a first bitmap containing a first plurality of binary digits and a second bitmap containing a second plurality of binary digits, said first and second bitmaps organized according to each of the plurality of logical storage subsystems in the storage system, each bit in said first and second bitmaps representing each of said plurality of storage volumes subject to a persistent operation, wherein:

each of said plurality of volumes is associated with a first corresponding binary digit included in said first plurality of binary digits that indicates whether said persistent operation is outstanding and each of said plurality of volumes is also associated with a second corresponding binary digit included in said second plurality of binary digits that indicates whether said persistent operation is in progress, upon a system-wide persistent operation which has been executed on said storage system, said first and second bitmaps are copied from a local meta data control structure onto said global meta data control structure, and each time an inaccessible volume of the plurality of volumes becomes available, a volume-online preparation procedure queries to determine if a persistent operation is pending for said inaccessible volume, wherein if the query returns in the affirmative, said persistent operation is performed before said inaccessible volume becomes available.

12. The article of manufacture of claim 11, wherein the storage volume includes a magnetic storage device.

13. The article of manufacture of claim 12, wherein the magnetic storage device is a hard disk drive.

14. The article of manufacture of claim 11, wherein the persistent operation is an instruction to clear status track information.

15. The article of manufacture of claim 11, wherein the storage volume is a random access memory device.

* * * * *